United States Patent
Heinrich et al.

(10) Patent No.: US 11,757,612 B2
(45) Date of Patent: Sep. 12, 2023

(54) COMMUNICATING MANAGEMENT TRAFFIC BETWEEN BASEBOARD MANAGEMENT CONTROLLERS AND NETWORK INTERFACE CONTROLLERS

(71) Applicant: HEWLETT PACKARD ENTERPRISE DEVELOPMENT LP, Houston, TX (US)

(72) Inventors: David F. Heinrich, Houston, TX (US); Gennadiy Rozenberg, Houston, TX (US); Scott P. Faasse, Tomball, TX (US); Melvin K. Benedict, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/452,823

(22) Filed: Oct. 29, 2021

(65) Prior Publication Data

US 2023/0134197 A1 May 4, 2023

(51) Int. Cl.
*H04L 29/06* (2006.01)
*H04L 7/00* (2006.01)

(52) U.S. Cl.
CPC .......... *H04L 7/0037* (2013.01); *H04L 7/0012* (2013.01)

(58) Field of Classification Search
CPC .............................. H04L 7/0037; H04L 7/0012
See application file for complete search history.

(56) References Cited

U.S. PATENT DOCUMENTS

| | | | |
|---|---|---|---|
| 4,831,338 A * | 5/1989 | Yamaguchi | H04L 7/033 331/25 |
| 5,901,293 A | 5/1999 | Claxton | |
| 6,192,428 B1 | 2/2001 | Abramson et al. | |
| 6,798,784 B2 | 9/2004 | Dove et al. | |
| 6,996,681 B1 | 2/2006 | Autechaud | |
| 7,336,300 B2 | 2/2008 | Hirasawa | |
| 8,713,277 B2 | 4/2014 | Lilly et al. | |
| 9,092,330 B2 | 7/2015 | Gilda et al. | |
| 10,007,632 B2 | 6/2018 | Bailey et al. | |
| 2013/0114441 A1 | 5/2013 | Yoo et al. | |
| 2017/0359139 A1* | 12/2017 | Butterworth | H04L 69/08 |

FOREIGN PATENT DOCUMENTS

WO     WO-02100073     12/2002

* cited by examiner

*Primary Examiner* — Jamal Javaid
(74) *Attorney, Agent, or Firm* — Hewlett Packard Enterprise Patent Department

(57) ABSTRACT

A process includes a port of a bridge providing a reference clock signal to a first end of an interconnect extending between the first port and a network interface controller. The reference clock signal propagates over the interconnect to provide, at a second end of the interconnect, a delayed reference clock signal at the network interface controller. Pursuant to the process, the bridge senses a timing of the delayed reference clock signal. The process includes communicating management traffic between a network interface of a baseboard management controller and the network interface controller via the interconnect. The communication of the management traffic includes the port, responsive to the sensing of the timing of the delayed reference clock signal, synchronizing communication of data with the first end of the interconnect to the delayed reference clock signal.

16 Claims, 7 Drawing Sheets

COMMUNICATING MANAGEMENT TRAFFIC BETWEEN BASEBOARD MANAGEMENT CONTROLLERS AND NETWORK INTERFACE CONTROLLERS

BACKGROUND

A computer platform (e.g., a server) may include a specialized service processor, called a "baseboard management controller," or "BMC," for purposes of monitoring and managing the platform. As part of this monitoring and managing, the BMC may oversee one or multiple network interface controllers (also called a "network interface cards"), or "NICs," of the computer platform. A NIC provides network connectivity for components of the computer platform. Computer technology is ever-evolving, and more recent computer platforms may have "smart NICs." In addition to providing network connectivity, a smart NIC may offload processing operations that were traditionally performed by general purpose central processing units (CPUs) of legacy computer platforms.

DETAILED DESCRIPTION

Figure 1:
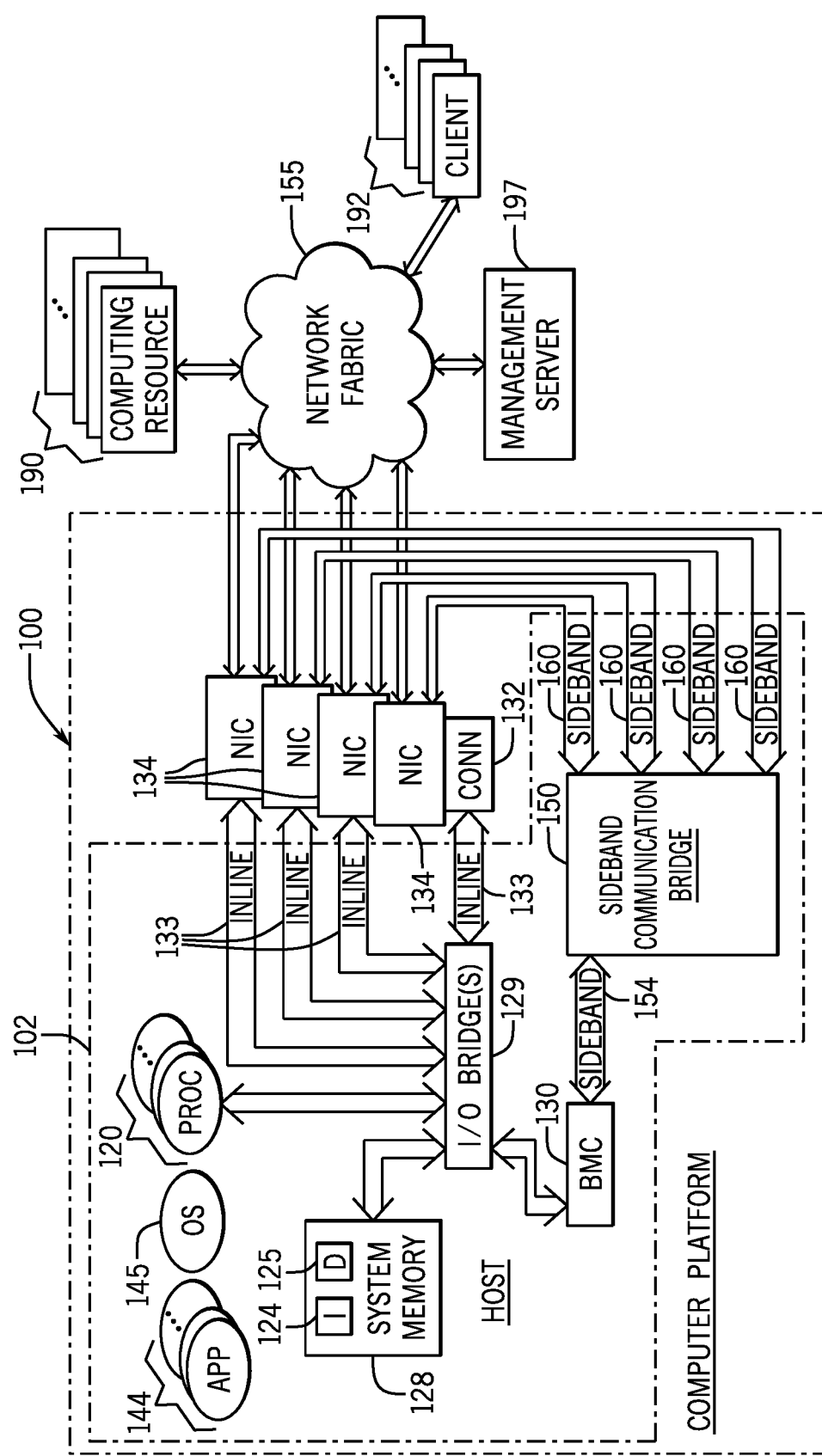
FIG. 1 is a schematic diagram of a computer platform having a sideband communication bridge to communicate sideband management traffic between a baseboard management controller (BMC) and network interface controllers (NICs) according to an example implementation.

As example of the roles that a BMC may perform for a computer platform, the BMC may power up the computer platform; power down the computer platform; monitor sensors (e.g., temperature sensors, cooling fan speed sensors); monitor an operating system status; monitor power statuses; log events in the computer platform; control boot paths; control the use of virtual media; control security checks; update firmware; validate software; validate hardware; enable boot functionality; perform recovery operations after an operating system failure or other significant failure; and so forth. The BMC may provide management functions, which may be controlled by a remote management server. Moreover, the BMC may be powered independently from other portions of the computer platform, allowing the remote management server to manage operations for the computer platform, even when other subsystems of the computer platform are powered down.

The BMC may manage peripherals of the computer platform, such as network interface controllers (NICs). A NIC provides network connectivity for components of the computer platform. The NIC may communicate through a main in-band interconnect with components of the computer platform, and the NIC may be connected by network cabling (e.g., an Ethernet cable) to network fabric (switches, gateways, and so forth). Here, an "in-band interconnect" (also called an "inline interconnect" herein) refers to a main, or primary, communication interface for the NIC, such as, for example, a Peripheral Component Interconnect express (PCIe) link, or interconnect, or an Open Compute (OCP) interface.

The NIC may be a "smart NIC," which means that in addition to providing network connectivity, the NIC provides backend input/output (I/O) services for the computer platform. As examples, the I/O services may include network virtualization services (e.g., overlay network services, virtual switching services, virtual routing services and network function virtualization services); network storage services; networking monitoring services; storage acceleration services (e.g., non-volatile memory express (NVMe)-based services); security services (e.g., cryptography services and network firewall services); and so forth.

The BMC may be mounted to a motherboard of the computer platform, and for purposes of managing a NIC, the BMC may be connected to the NIC through a sideband interconnect. As used herein, a "sideband interconnect" refers to a secondary, limited access communication interface for the NIC, which is separate from the NIC's in-band interconnect and is used for a specific purpose. For example, the specific purpose may be communicating management data, or traffic, between the NIC and the BMC. The BMC may communicate management traffic with a given NIC for a variety of different purposes such as monitoring events of the NIC; monitoring sensors of the NIC; configuring the NIC; powering down the NIC; powering up the NIC; updating firmware of the NIC; performing an integrity measurement of software of the NIC; validating software of the NIC; validating hardware of the NIC; setting a boot path for the NIC; performing a recovery operation for the NIC; and so forth.

The sideband interconnect for a given NIC may take on one of many different potential forms. For example, the sideband interconnect may be a cable-based interconnect (e.g., an interconnect including a cable), or the sideband interconnect may be cableless (e.g., formed from conductive traces on the motherboard). As a more specific example, the BMC may communicate management traffic with a given NIC via a multiple wire ribbon cable or flat cable that connects (at one end of the cable) to a corresponding connector of the NIC and connects (at the cable's other end) to a connector on the motherboard of the computer platform. As another example, the BMC may communicate management traffic with a given NIC through electrically conductive traces that are formed on or in a multiple layer motherboard circuit substrate, and these traces may, for example, be connected to terminals of a slot connector for the NIC.

The sideband interconnect may provide full duplex communication between its two endpoints (or "ends"). For this purpose, the sideband interconnect communicates a clock signal; one or multiple data signals corresponding to a first channel for communications in one direction over the interconnect; and one or multiple data signals corresponding to a second channel for communications over the interconnect in the other direction. The communication of the data signals of the sideband interconnect may be synchronized to active edges of the clock signal. Here, the "active edge" (or "active clock edge") refers to a particular clock edge, such as a positive going, or rising, edge of the clock signal.

As a more specific example, a transmitter at one end of the sideband interconnect may change the states of data signals of a channel (corresponding to a sequence of data bits) in synchronization with rising edges of the clock signal (i.e., the rising edge is the "active clock edge"). To transmit a particular data bit, the transmitter may, for example, drive the data signal to the logic level corresponding to the data bit, and the driving of the data signal is triggered by the active clock edge. Therefore, to transmit a sequence of data bits, the transmit drives the data signal in in response to time successive active clock edges. The receiver, at the other end of the sideband interconnect, captures data bits from the channel in synchronization with the active clock edges. To receive a particular data bit, the receiver samples the data bit signal, and this sampling is triggered by an active clock edge. Therefore, to receive a sequence of data bits, the receiver samples the data signal in response to time successive active clock edges.

Due to signal propagation delays that are introduced by the sideband interconnect, the clock and data signals at one end of the sideband interconnect may be skewed, or delayed, relative to the clock and data signals at the other end of the sideband interconnect. Moreover, because the rate at which the data bit logic levels change may be different than the clock frequency, the delay for a given data signal may be different than the delay for the clock signal. If not properly addressed, the signal propagation delays may cause metastability issues in the data communication and may cause the receivers to capture incorrect data bits.

To avoid metastability issues, a standard for the sideband interconnect may set forth timing metrics, which define boundaries for the timing relationship between the data signal and the active clock edge. For example, the timing metrics may include a minimum setup time and a minimum hold time, which establish a minimum time window of stability for the data signal about the active clock edge. The minimum setup time refers to a minimum time for the data signal to be stable before the active clock edge, and the minimum hold time refers to a minimum time for the data signal to be stable after the active clock edge. As described further herein, in accordance with example implementations, a first endpoint at one end of a sideband interconnect synchronizes its communications with the sideband interconnect with a clock signal that appears at a second endpoint at the other end of the sideband interconnect. This synchronization, in accordance with example implementations, provides the advantage of maximizing the time for a data signal that is communicated across the sideband interconnect to stabilize before the data signal is captured by the first or second endpoint (depending on the direction of transmission).

Due to the signal propagation delays that are introduced by the sideband interconnect, timing metric violations may potentially occur, if the appropriate compensation is not provided. For example, a data signal arriving at the receiver may potentially be skewed (relative to the clock signal) to the extent that the data signal is not stable for the minimum setup time before the active clock edge. Measures may be employed for a specific sideband interconnect to resolve timing metric violations. For example, a delay may be added to the clock signal for a specific sideband interconnect to cure minimum setup time violations.

The sideband interconnect, in accordance with example implementations, may communicate signals based on the Reduced Media Independent Interface (RMII) Specification, which is published by the RMII Interface Consortium (1997). Moreover, in accordance with some implementations, the BMC may communicate with multiple NICs of the computer platform via multiple sideband interconnects. For these example implementations, the communication of signals over the sideband interconnects may be based on the Network Controller-Sideband Interface (NC-SI) Specification, which is published by the Distributed Management Task Force (2009). The NC-SI Specification is based on the RMII Specification, and includes modifications (e.g., the addition of an arbitration signaling and protocol) to support communication between a single BMC and multiple NICs.

The computer platform may have multiple NICs, and physical characteristics of the sideband interconnects for the NICs may vary. As examples, a sideband interconnect for one NIC may be a cable-based interconnect; a sideband interconnect for another NIC may be a non-cable, circuit board trace-based interconnect; cable-based sideband interconnects for different NICs may have different associated physical lengths; circuit board trace-based sideband interconnects may have different associated lengths; and so forth. Moreover, for a given computer platform, different NICs from different manufacturers and having sideband interconnects with varying physical characteristics may be installed in the computer platform over platform's lifetime. Due to these variations in the physical characteristics of the sideband interconnects, the signal propagation characteristics may vary among the sideband interconnects to the extent that measures to meet the timing metrics for one sideband interconnect may not be sufficient to meet the timing metrics for another sideband interconnect.

In accordance with example implementations that are described herein, a computer platform (e.g., a server, such as a blade server) includes a sideband communication bridge that communicates management traffic between a BMC and multiple NICs in a manner that accommodates sideband interconnects that have different physical characteristics. More specifically, in accordance with example implementations, the NICs and the BMC may be coupled to different respective ports of the sideband communication bridge. In accordance with example implementations, via the sideband communication bridge, the BMC may transmit management traffic to the NICs using transmit channels of the sideband interconnects. Moreover, the NICs may, via the sideband communication bridge, communicate (one at a time) management traffic to the BMC using receive channels of the sideband interconnects.

In accordance with example implementations, each NIC may communicate with a NIC port of the sideband communication bridge over an associated sideband interconnect. In accordance with example implementations, the sideband communication bridge synchronizes data communication between each NIC port and the associated sideband interconnect to adjust to the physical characteristics of the sideband interconnect and meet timing metrics. The synchronization of data communication, in this context, refers to the NIC port synchronizing the launching of data signals to the sideband interconnect in synchronization with active edges of an adjusted clock signal (also called a "feedback clock signal" herein). The synchronization of data communication further includes the NIC port synchronizing the reception of data signals from the sideband interconnect in synchronization with active edges of the adjusted clock signal. The timing of the adjusted clock signals (or "feedback clock signals") may, as described herein, vary among the NIC ports to accommodate variations in the physical characteristics of the sideband interconnects.

More specifically, in accordance with example implementations, the NIC ports of the sideband communication bridge may provide reference clock signals (i.e., a set of synchronized clock signals) to the NIC port ends (or "endpoints") of the associated sideband interconnects. Each reference clock signal propagates over the sideband interconnect and is received by the associated NIC at the other end of the sideband interconnect. The sideband interconnect introduces a propagation delay to the reference clock signal such that the version of the referenced clock signal (herein called the "delayed reference clock signal") that is received at the NIC end of the sideband interconnect is delayed with respect to the reference clock signal that is provided to the NIC port end of the sideband interconnect. In accordance with example implementations, the NIC synchronizes its communication of data with the sideband interconnect to active edges of the delayed reference clock signal, and the NIC port of the sideband communication bridge also synchronizes its communication of data with the sideband interconnect to the active edges of the delayed reference clock signal. Stated differently, in accordance with example implementations, each NIC port launches data signals to the sideband interconnect in synchronization with the active edges of the delayed reference clock signal (i.e., the clock signal received by the NIC), and each NIC port receives data signals from the sideband interconnect in synchronization with the active edges of the delayed reference clock signal.

The sideband communication bridge, in accordance with example implementations, senses the delayed reference clock signals to provide corresponding feedback clock signals, which are replicas or near replicas of the corresponding delayed reference clock signals. Moreover, in accordance with example implementations, each NIC port synchronizes the communication of data with the sideband interconnect to the active edges of the associated feedback clock signal. Therefore, in accordance with example implementations, the sideband communication bridge matches the timing of the active edges of the clock signal at the NIC port end of the sideband interconnect with the timing of the active clock edge at the NIC end of the sideband interconnect. In accordance with example implementations, due to the matching of clock signals at the opposite ends of the sideband interconnect, the data signals at the receiving end of the interconnect are given the maximum amount of time to stabilize before the states of the data signals are captured.

In accordance with some implementations, the sideband interconnect includes two clock communication lines: a first clock communication line to communicate the reference clock signal to the NIC; and a second clock communication line (called a "clock feedback path" herein) to provide a feedback clock signal to the sideband communication bridge. The first clock communication line has a first end at the NIC port (to receive the reference clock signal) and a second end at the NIC (to provide the delayed reference clock signal). Unlike the first clock communication line, the clock feedback path extends in a loop so that both ends of the clock feedback path terminate at the NIC port. The sideband communication bridge provides the reference clock signal to one end of the clock feedback path. The clock feedback path has a physical length that is near or at the physical length of the first clock communication line, and the reference clock signal propagates over the clock feedback path to provide, at the other end of the clock feedback path, a feedback clock signal that is identical to, or at least approximates, the delayed reference clock signal that is received by the NIC. Therefore, in accordance with example implementations, for a given sideband interconnect, both the NIC port and the NIC effectively synchronize their respective communications with the sideband interconnect to the same clock signal.

Referring to FIG. 1, as a more specific example, in accordance with some implementations, a computer platform 100 may include a host 102 and a BMC 130 that manages the host 102. In accordance with at least some implementations, the host 102 may include one or multiple NICs 134. A blade server is an example of the computer platform 100, in accordance with an example implementation. The computer platform 100 may, however, be a platform other than a blade server, in accordance with further implementations, such as a rack-mounted server, a client, a desktop, a smartphone, a laptop computer, a tablet computer, and so forth. The NICs 134 may be, in accordance with example implementations, one or multiple of the following NICs, as well as other NICs: a smart NIC; a non-smart NIC; a PCIe card-based NIC or an Open Compute Project (OCP) card-based NIC.

Regardless of the particular form of the computer platform 100, in accordance with example implementations, the host 102 may include components that, in general, may provide one or multiple operating system instances (e.g., operating system instances as part of virtual machines and non-virtual machine-based operating system instances). As an example, in accordance with some implementations, the host 102 may include actual physical hardware, such as hardware processors, or hardware processing cores 120 (e.g., central processing unit (CPU) cores, graphics processing unit (GPU) cores, and so forth); a system memory 128; a bus infrastructure; I/O devices; and so forth. In addition to hardware components, in accordance with example implementations, the host 102 may include software components, i.e., components that are formed in whole or in part from one or multiple processing cores 120 executing machine-executable instructions (or "software"). FIG. 1 depicts example software components, such as an operating system 145 and applications 144.

In accordance with example implementations, the software components may be formed by one or multiple processing cores 120 executing machine-executable instructions 124 that are stored in a system memory 128 of the computer platform 100. Moreover, the execution of the instructions 124 may involve the storage of data 125 in the system memory 128. In accordance with example implementations, the system memory 128 and other memories that are discussed herein are non-transitory storage media that may be formed from semiconductor storage devices, memristor-based storage devices, magnetic storage devices, phase change memory devices, a combination of devices of one or more of these storage technologies, and so forth. The system memory 128 may represent a collection of both volatile memory devices and non-volatile memory devices.

In accordance with example implementations, the computer platform 100 may be one of multiple computing resources 190 that are part of a cloud computing system. For these example implementations, the computer platform 100 may have a cloud centric architecture, and one or multiple NICs 134 may be smart NICs. The smart NICs may, for example, provide various I/O services for software of the computer platform 100 such as network virtualization services (e.g., overlay network services, virtual switching services, virtual routing services and network function virtualization services); network storage services; networking monitoring services, storage acceleration services; security services (e.g., cryptography services and network firewall services); and so forth. In accordance with some implementations, the processing cores 120 may execute various instances of the applications 144 (e.g., application instances executing in virtual machines, within certain containers, and so forth) associated with tenant-associated clients 192 of the cloud computer system. The execution of such tenant software may consume one or multiple of the smart NIC-provided I/O services. Communications between the components of the host 102 and the NICs 134 may occur via inline interconnects 133 (or "in-band interconnects 133").

As depicted in FIG. 1, in accordance with example implementations, the NICs 134, computing resources 190 and clients 192 of the cloud computing system may be coupled by network fabric 155. In general, the network fabric 155 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

Regardless of the particular use of the computer platform 100, the BMC 130 may manage the NICs 134, and for this purpose, the BMC 130 may communicate with the NICs 134 via respective associated sideband interconnects 160. For this purpose, in accordance with example implementations, the BMC 130 has a network interface that communicates, via a sideband communication interconnect 154 (also called a "BMC sideband interconnect 154" herein), with a corresponding port of a sideband communication bridge 150. The sideband communication bridge 150 has ports (called "NIC ports" herein) that are coupled to corresponding sideband interconnects 160 for the NICs 134. At least some of the management functions of the BMC 130 may be controlled by a remote management server 197 that, in accordance with example implementations, communicates with the BMC 130 via a NIC (not show) of the BMC 130.

As examples of different management actions that the BMC 130 may perform for a given NIC 134, the BMC 130 may, via communications that occur over the corresponding sideband interconnect 160, change a power state of the NIC 134 (e.g., turn off the NIC 134, reset the NIC 134, power up the NIC 134, and so forth); select a boot path for booting and loading an operating system of the NIC 134; select and configure virtual media for use by the NIC 134; update firmware of the NIC 134; and so forth. Moreover, the BMC 130 may, via communications that occur over the sideband interconnect 160, monitor sensors of the NIC 134; gather information relating to environmental conditions and events related to the NIC 134 so that the conditions and events may be reported by the BMC 130 to the remote management server 197; perform corrective action on the NIC 134, such as taking corrective action after an operating system failure or other failure of the NIC 134; and so forth. As examples of other management functions, the BMC 130, may, in accordance with some implementations, communicate over the sideband interconnects 160 to validate software of the NICs 134; detect hardware faults on the NICs 134; perform software measurements associated with the NICs 134; and so forth.

As used herein, a "BMC," or "baseboard management controller," is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) application program interface (API), or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

One or multiple NICs 134 may be installed in corresponding slot connectors 132 (e.g., slot connectors 132 mounted to a motherboard or other circuit substrate of the computer platform 100). As an example, in accordance with some implementations, the connectors 132 may include one or multiple PCIe card connectors; one or multiple OCP connectors; and so forth.

The physical characteristics of the sideband interconnects 160 may vary. For example, in accordance with some implementations, a sideband interconnect 160 may be a cable-based interconnect, i.e., an interconnect involving a cable (e.g., a flat cable or ribbon cable) that extends between a cable connector on the motherboard and a cable connector on the circuit substrate of the NIC. As another example, in accordance with example implementations, a given NIC 134 may have a sideband interconnect 160 that is formed from electrically conductive traces on a circuit board substrate, such as the motherboard. As another example, in accordance with some implementations, a given slot connector 132 associated with the NIC 134 may communicate in-band signals as well as sideband signals associated with the sideband interconnect 160.

Among the other features of the computer platform 100, in accordance with some implementations, a bus infrastructure of the computer platform 100 may include one or multiple input/output I/O bridges 129 that may be coupled to the system memory 128; one or multiple expansion buses (e.g., PCIe links); and so forth. In general, the I/O bridge(s) 129 may include interfaces to various buses of the computer platform 100, such as a PCIe links, a Serial Peripheral Interconnect (SPI) bus, an enhanced SPI (eSPI) bus, a Low Pin Count (LPC) bus, an inter-Integrated ($I^2C$) bus, an improved inter-Integrated ($I^3C$) bus, as well as possibly one or multiple other buses or communication links associated with other standards.

In accordance with some implementations, the I/O bridge(s) 129 may include a north I/O bridge 129 and a separate south I/O bridge 129. In this manner, in accordance with some implementations, the processing core 120 may include one or multiple semiconductor packages (or "chips"), and the processing core 120 may include the north I/O bridge 129 that includes a memory controller and PCIe root ports. The south I/O bridge 129 that may provide I/O ports, such as, for example, Serial Advanced Technology Attachment (SATA) ports, Universal Serial Bus (USB) ports, LPC ports, SPI ports, eSPI ports and so forth. In accordance with some implementations, the north I/O bridge 129 may not be part of the processing core 120. In accordance with further implementations, the north and south I/O bridges may be combined into a single I/O bridge 129; and in accordance with some implementations, this single I/O bridge 129 may be part of a multi-core central processing unit (CPU) semiconductor package (or "chip"), which contains multiple processing cores 120.

Figure 2:
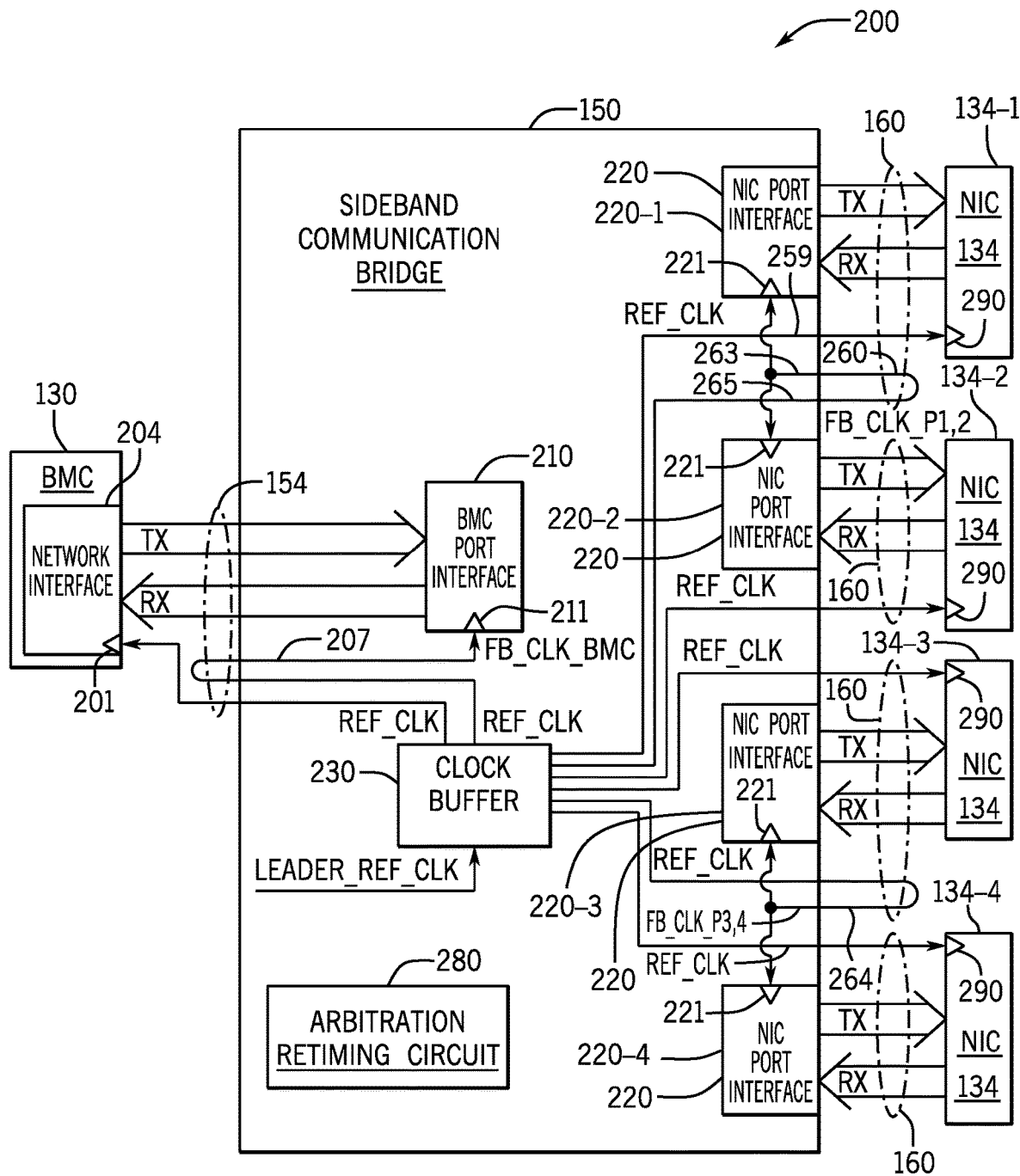
FIG. 2 is a schematic diagram of the sideband communication bridge of FIG. 1 according to an example implementation.

Referring to FIG. 2 in conjunction with FIG. 1, in accordance with example implementations, the sideband interconnects 154 and 160 comply with the NC-SI Specification, although the sideband interconnects 154 and 160 may communicate management traffic using signaling and protocols pursuant to another standard or specification, in accordance with further implementations. In accordance with example implementations, each interconnect 154,160 includes multiple bit data transmission channels (denoted by "TX" in FIG. 2) to communicate management traffic that is transmitted by the BMC 130; multiple bit data reception channels (denoted by "RX" in FIG. 2) to communicate data transmitted by the NICs 134 to the BMC 130; a clock signal; and optional arbitration-related signals.

In general, the sideband communication bridge 150 handles communication synchronization to allow sideband interconnects 160 of different types and lengths to be used with the NICs 134. It is noted that although FIG. 2 depicts four NICs 134-1, 134-2, 134-3 and 134-4, in accordance with further example implementations, the computer platform 100 may contain more than four NICs 134 or fewer than four NICs 134.

In view of the single RX channel of the sideband interconnect 154 between the BMC 130 and the sideband communication bridge 150, a single NIC 134 transmits data to the BMC 130 at any one time. As described further herein, in accordance with some implementations, the NICs 134 use serial token-based arbitration to determine which NIC 134, at a particular time, has the right to transmit data to the BMC 130. This data transmission by the NIC 134 occurs of the RX channel of the corresponding sideband interconnect 160 and the RX channel of the sideband interconnect 154. In accordance with example implementations, the NICs 134 serially communicate an ownership token such that the NIC 134 that has ownership of the token may assert a token ownership signal, and the sideband communication bridge 150 responds to the assertion of the token ownership signal to receive the transmit data from the NIC 134 that has the token ownership and communicate this data to the BMC 130.

For purposes of transmitting management traffic from the BMC 130, such arbitration may not be used. In this manner, in accordance with example implementations, the sideband communication bridge 150 may, for example, broadcast the data that is transmitted through the TX transmit channel of the interconnect 154 to the TX transmit channels of all of the sideband interconnects 160, with each individual NIC 134 determining whether or the transmitted data targets the NIC 134.

In accordance with some implementations, the management traffic may be communicated between the BMC 130 and the NICs 134 in the form of data packets. The data packet, may, for example, contain a header (which contains data representing a source address, a destination address, and so forth) and payload data. In accordance with some implementations, the packets may include control packets that are communicated among the BMC 130 and the NICs 134, and the packets may include pass-through packets that are communicated between the BMC 130 and remote entities, such as the remote management server 197 (FIG. 1).

In accordance with example implementations, the sideband communication bridge 150 includes NIC port interfaces 220, such as, for example, NIC port interfaces 220-1, 220-2, 220-3 and 220-4 that communicate with the NICs 134-1, 134-2, 134-3 and 134-4, respectively, over corresponding sideband interconnects 160. In accordance with example implementations, the sideband communication bridge 150 includes a clock buffer 230 that receives a leader reference clock (labeled as a "LEADER_REF_CLK" clock signal in FIG. 2) to produce corresponding reference clock signals (labeled as "REF_CLK" clock signals in FIG. 2). In accordance with example implementations, the reference clock signals and leader reference clock signal may be identical. In accordance with example implementations, the sideband communication bridge 150 provides the REF_CLK reference clock signals to the clock signal line of each of the interconnects 154 and 160. In accordance with example implementations, the REF_CLK reference clock signal propagates from the sideband communication bridge 150 over the clock signal line of each respective sideband interconnect 160 to arrive at each NIC 134. Moreover, in accordance with example implementations, the REF_CLK reference clock signal propagates from the sideband communication bridge 150 over the sideband interconnect 154 to arrive at the BMC 130.

The NIC 134 receives a delayed version of the REF_CLK reference clock from the clock signal line of the sideband interconnect 160 at a clock input 290 of the NIC 134, and the NIC 134 synchronizes communications with the sideband interconnect 160 in synchronization with the received, delayed version of the REF_CLK reference clock signal. In other words, the NIC 134 transmits data to the RX receive channel of the sideband interconnect 160 in synchronization with active edges of the received, delayed version of the REF_CLK reference clock signal, and the NIC 134 receives data from the TX channel of the sideband interconnect 160 in synchronization with the received, delayed version of the REF_CLK reference clock signal.

In accordance with example implementations, the clock buffer 230 also provides one or multiple REF_CLK reference clock signals to one or multiple clock feedback paths that are associated with the sideband interconnects 160. It is noted that a given clock feedback path may be associated with one or multiple sideband interconnects 160. For example, in accordance with some implementations, the sideband communication bridge 150 provides a REF_CLK reference clock signal to a clock feedback path 260 that is associated with the sideband interconnects 160 for the NICs 134-1 and 134-2. The clock feedback path 260, in accordance with example implementations, has a physical length that is exactly or near exactly the same length as each of the clock lines of these sideband interconnects 160. Because the sideband interconnects 160 for the NICs 134-1 and 134-2 are assumed to be identical for this example, the clock feedback path 260 may be part of either sideband interconnect 160. For the example implementation that is depicted in FIG. 2, the clock feedback path 260 is part of the sideband interconnect 160 that is connected to the NIC 134-1.

In accordance with further implementations, the clock feedback path may not be part of a particular sideband interconnect 160 but may have a length that corresponds to a length of the clock line of the sideband interconnect 160. Moreover, in accordance with further implementations, the length of the clock feedback path may not be identical or near identical to the length of the clock line of the sideband interconnect 106, but rather, the length of clock feedback path may have a predetermined length relationship to the clock line (e.g., the length of the clock feedback path may be one fourth or one half of the length of the clock feedback path), and based on this predetermined length relationship, the sideband communication bridge 150 may provide a clock signal at the NIC port 220, which matches the clock signal at the NIC 134.

The REF_CLK reference clock signal is received by a first end 263 of the feedback clock signal path 260, and the REF_CLK reference clock signal propagates over the clock feedback path 260 to produce, at a second end 265 of the clock feedback path 260, a feedback clock signal (labeled as "FB_CLK_P1,2" in FIG. 2). The NIC port interfaces 220-1 and 220-2 clock, or synchronize, communications with the respective sideband interconnects 160 to the FB_CLK_P1,2 clock signal (instead of, for example, the NIC port interfaces 220-1 and 220-2 synchronizing communications to the REF_CLK reference clock signal). For this example, the sideband interconnects 160 for the NICs 134-1 and 134-2 have similar physical characteristics. For example, the NICs 134-1 and 134-2 may each be PCIe-based NICs having similar sideband interconnects 160. As such, in accordance with some implementations, the sideband communication bridge 150 may apply the same feedback clock signal to multiple sideband interconnects 160.

In a similar manner, in accordance with some implementations, the interconnects 160-3 and 160-4 may have similar physical characteristics. For example, the NICs 134-3 and 134-4 may be OCP-based NICs. This allows the sideband communication bridge 150 to use a single clock feedback path 264 to provide a feedback clock signal (labeled "FB_CLK_P3,4" in FIG. 2) to clock sideband interconnect communications by the NIC port interfaces 220-3 and 220-4.

In accordance with further example implementations, each of the NIC port interfaces 220-1, 220-2, 220-3 and 220-4 may have their own respective feedback clock paths for purposes of deriving a feedback clock signal to clock these port interfaces; three of the NIC port interfaces 220 may have an associated clock feedback path; four NIC port interfaces 220 have may have their own individual clock feedback paths; and so forth.

As also depicted in FIG. 2, in accordance with some implementations, the clock buffer 230 may also provide the REF_CLK reference clock signal to a clock line of the BMC sideband interconnect 154 and provide a REF_CLK reference clock signal to a clock feedback path 207 that is associated with the BMC sideband interconnect 154. In this manner, in accordance with example implementations, the sideband communication bridge 150 includes a BMC port interface 210 that communicates with the BMC sideband interconnect 154; and a clock input 211 of the BMC port interface 210 receives a feedback clock signal (labeled "FB_CLK_BMC" in FIG. 2). The FB_CLK_BMC feedback clock signal, in accordance with example implementations, matches a delayed version of the REF_CLK reference clock, which is received by a clock input 201 of a network interface 204 of the BMC 130 and used by the network interface 204 to synchronize communications with the BMC sideband interconnect 154.

In accordance with further example implementations, the clock feedback-based matching may not be used by the BMC port interface 210. Accordingly, for these example implementations, the clock input 211 of the BMC port interface 210 may receive the non-delayed, REF_CLK reference clock signal and synchronize communications with the BMC sideband interconnect 154 with this clock signal.

Among its other features, in accordance with some implementations, the sideband communication bridge 150 may include an arbitration retiming circuit 280. The arbitration retiming circuit 280 retimes, or resynchronizes, arbitration-related communications among the NICs 134-1, 134-2, 134-3 and 134-4, as further described below in connection with FIG. 4.

Figure 3:
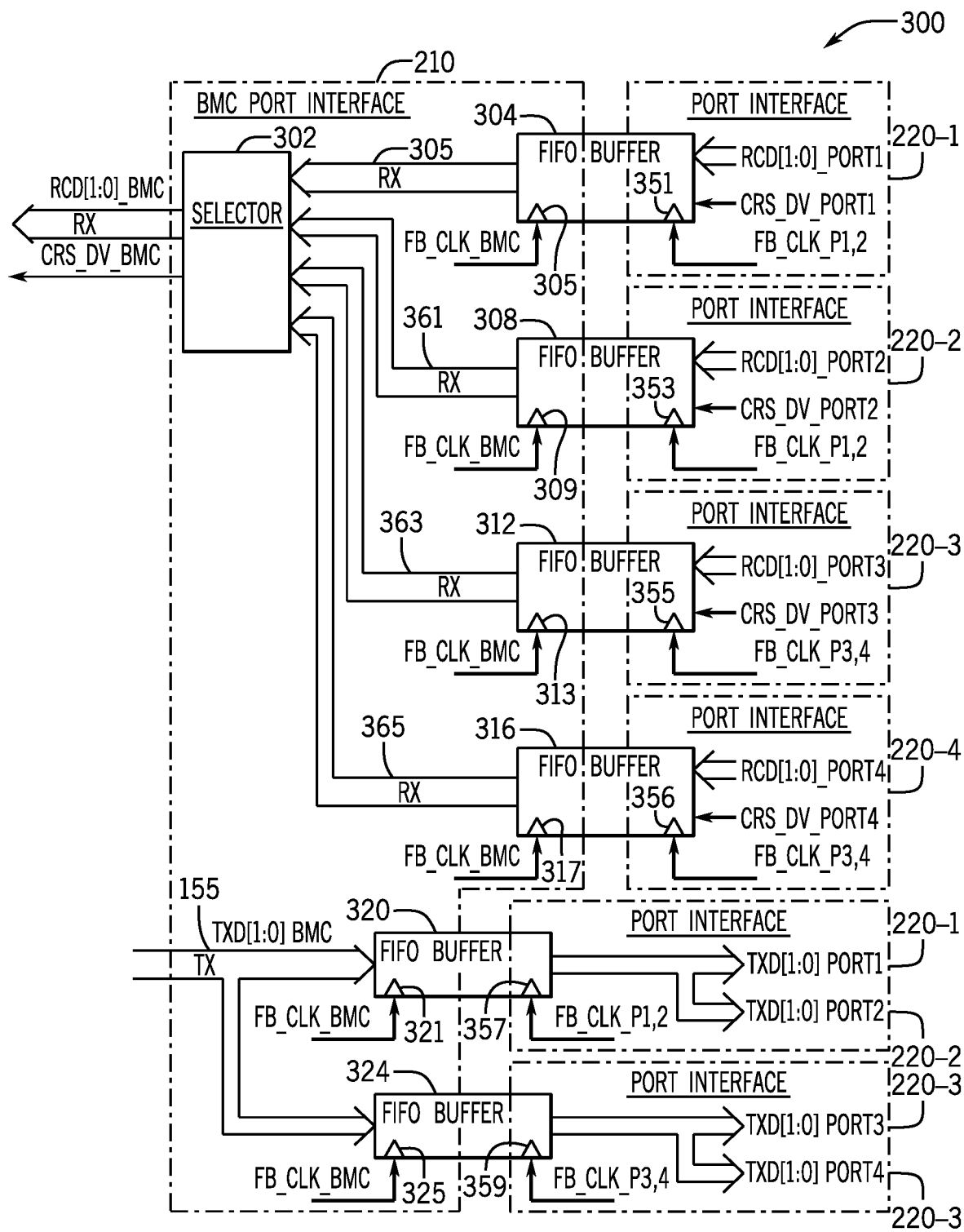
FIG. 3 is a schematic diagram of first-in-first-out (FIFO) buffers of port interfaces of the sideband communication bridge according to an example implementation.

FIG. 3 illustrates a transmit and receive path architecture 300 of the sideband communication bridge 150 in accordance with example implementations. Referring to FIG. 3 in conjunction with FIGS. 1 and 2, the architecture 300 includes receive first-in-first-out (FIFO) buffers 304, 308, 312 and 316 that are associated with the RX channels. In this manner, input sides of the FIFO buffers 304, 308, 312 and 316 are associated with the sideband interconnect RX channels for the NIC port interfaces 220-1, 220-2, 220-3 and 220-4, respectively. The output sides of the FIFO buffers 304, 308, 312 and 316 are associated with the RX channel for the BMC sideband interconnect 154 (i.e., associated with the RX channel for the BMC port interface 210). The architecture 300 also includes transmit FIFO buffers 320 and 324. The output side of the FIFO buffer 320 is associated with the sideband interconnect TX channels for the NIC port interfaces 220-1 and 220-2. The output side of the FIFO buffer 324 is associated with the sideband interconnect TX channels for the NIC port interfaces 220-3 and 220-4. The input sides of the FIFO buffers 320 and 324 are associated with the TX channel for the BMC sideband interconnect 154 (i.e., associated with the TX channel for the BMC port interface 210).

More specifically, regarding the receive FIFO buffers, the FIFO buffer 304 has an input side that receives data (represented by a two bit data signal labeled "RCD[1:0]_PORT1" signal) from the RX channel of the sideband interconnect 160 that is connected to the NIC 134-1. The input side of the FIFO buffer 304 has a clock input 351 that receives the FB_CLK_P1,2 feedback clock signal. The FIFO buffer 304 receives an arbitration token ownership signal labeled "CRS_DV_PORT1," which the NIC 134-1 asserts (e.g., drives high or drives to a logic one) to represent that the NIC 134-1 has possession of the ownership token. In other words, in accordance with example implementations, in response to the CRS_DV_PORT1 token ownership signal being asserted, the FIFO buffer 304 receives data from the NIC 134-1 in synchronization with the FB_CLK_P1,2 feedback clock signal.

The output side of the FIFO buffer 304, in accordance with example implementations, is associated with the RX channel of the BMC sideband interconnect 154. The output side of the FIFO buffer 304, in accordance with example implementations, has a clock input 305 that receives the FB_CLK_BMC feedback clock signal. Moreover, as depicted in FIG. 3, an output 305 of the FIFO buffer 304 is coupled to a multiplexer, or selector 302. The selector 302 couples the output 305 to the RX channel of the BMC sideband interconnect 154, in response to the NIC 134-1 asserting the CRS_DV_PORT1 token ownership signal. As depicted in FIG. 3, the selector 302 may provide assert a signal labeled "CRS_DV_BMC," which, when asserted, represents, to the BMC's network interface 204 (FIG. 2) that NIC data (represented by two bit data signal labeled "RCD [1:0]_BMC") is being communicated from the sideband communication bridge 150b to the BMC 130. Therefore, in accordance with example implementations, when the NIC 134-1 has possession of the ownership token, the NIC 134-1 communicates data through the FIFO buffer 304 to the BMC 130; and this communication involves synchronizing communication from the NIC 134 to the FB_CLK_P1,2 feedback clock signal and includes the sideband communication bridge 150 retiming, or resynchronizing, the data to the FB_CLK_BMC feedback clock signal.

In a similar manner, in accordance with example implementations, the other receive FIFO buffers 308, 312 and 316 have, for their respective input sections, clock inputs 351, 353, 355 and 356, respectively, that receive the FB_CLK_P1,2, FB_CLK_P3,4 and FB_CLK_P3,4 feedback clock signals, respectively. The input sections of the FIFO buffers 308, 312 and 316 receive data via two bit data signals labeled "RCD[1:0]_PORT2," "RCD[1:0]_PORT3" and "RCD[1:0]_PORT4," respectively. Moreover, the FIFO buffers 308, 312 and 316 receive corresponding token ownership signals labeled "CRS_DV_PORT2," "CRS_DV_PORT3" and "CRS_DV_PORT4," from the NIC 134-2, NIC 134-3 and NIC 134-4, respectively, such that when the corresponding NIC 134 asserts the token ownership signal, the input section receives data from the NIC 134. Moreover, in a similar manner to the FIFO buffer 304, in accordance with example implementations, the FIFO buffers 308, 312 and 316 have clock inputs 305, 309, 313 and 317, respectively, which receive the FB_CLK_BMC clock signal. The output sections of the FIFOS buffers 308, 312 and 316 provide outputs 361, 363 and 365, respectively, to the selector 302 so that the selector 302 provides routes the appropriate output to the RX channel of the BMC sideband interconnect 154 when the corresponding token ownership signal is asserted.

Regarding the transmit FIFO buffers, in accordance with example implementations, the FIFO buffer architecture 300 further includes FIFO buffers 320 and 324 that communicate transmit data from the TX channel of the sideband interconnect 154 to the sideband interconnects 160. More specifically, in accordance with example implementations, the FIFO buffer 320 has an input section that is clocked by the FB_CLK_BMC clock signal and receives data (represented by a two bit data signal labeled "TXD[1:0]_BMC") from the TX channel of the interconnect 154, i.e., the input section of the FIFO buffer 320 clocks the incoming data in synchronization with edges of the FB_CLK_BMC clock signal. The FIFO buffer 320 also has an output section that provides data to the interconnects 160 associated with the NICs 134-1 and 134-2. In this manner, as depicted in FIG. 3, data directed to either NIC 134-1 or 134-2 is transmitted to both NICs via respective two bit data signals labeled "TXD[1:0]_PORT1 and TXD[1:0]_PORT2 signals, respectively, in synchronization with the FB_CLK_P1,2 clock signal. In a similar manner, the FIFO buffer 324 has an input section that receives data from the TX channel of the interconnect 154, and the FIFO buffer 324 has an output section that, in synchronization with the FB_CLK_P3,4 clock signal, provides data to the NICs 134-1 and 134-4 via respective two bit data signals labeled "TXD[1:0]_PORT3 and TXD[1:0]_PORT4" signals, respectively.

Figure 4:
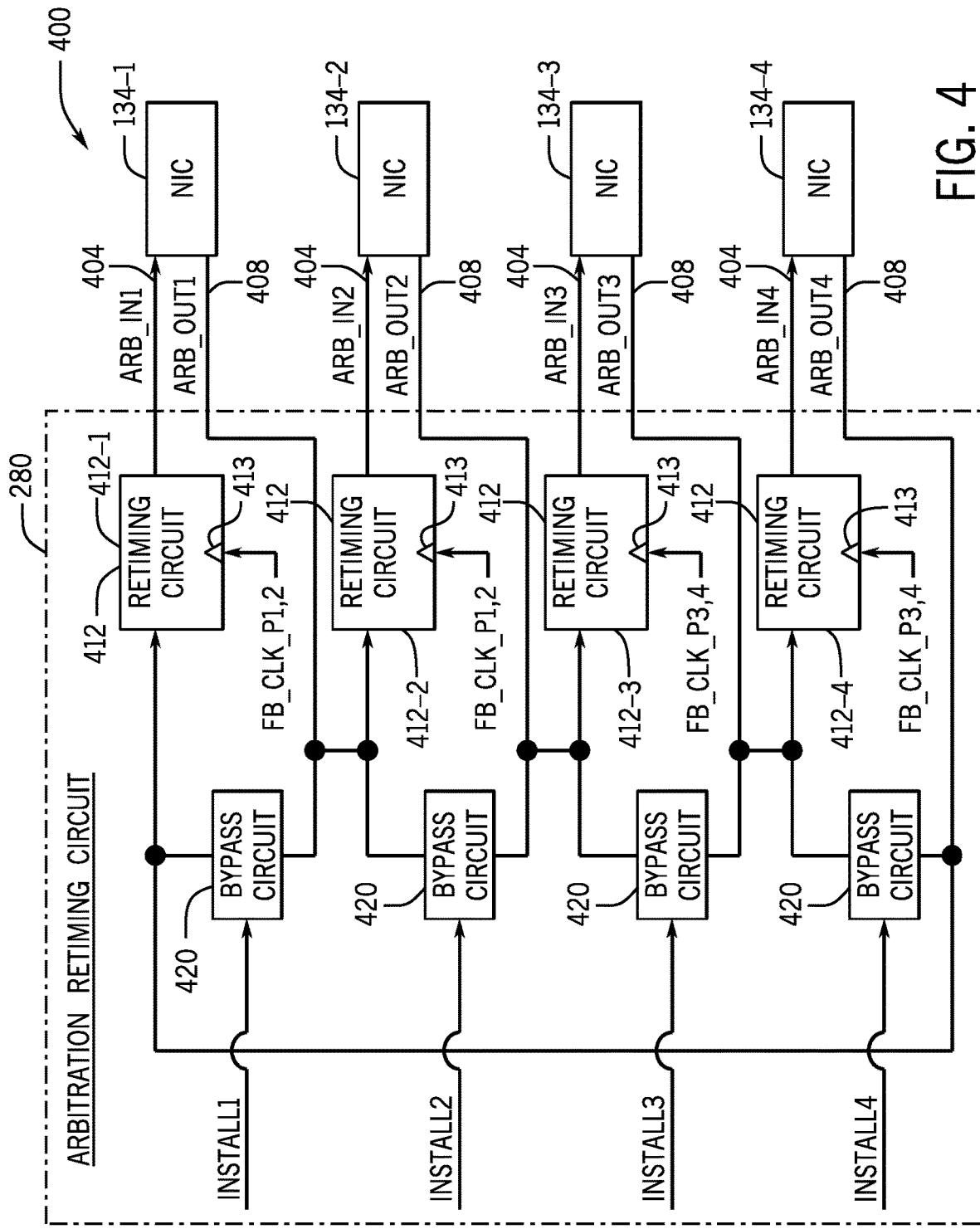
FIG. 4 is a schematic diagram of circuitry of the sideband communication bridge to retime arbitration signal communications according to an example implementation.

FIG. 4 depicts a retiming circuitry architecture 400 of the sideband communication bridge 150 in accordance with example implementations. Referring to FIG. 4 in conjunction with FIGS. 1, 2 and 3, in accordance with some implementations, the NICs 134 communicate an arbitration ownership token in a serial arbitration communication chain. The retiming architecture 400 includes the arbitration retiming circuit 280, which retimes the serial communication of the arbitration ownership token among the NICs 134-1, 134-2, 134-3 and 134-4 to accommodate the different respective NIC clock domains. In accordance with example implementations, one of the NICs 134 possesses the ownership token at any one time; and possession of the ownership token entitles the NIC 134 to transmit (to the exclusion of the other NICs 134) data to the RX channel of its associated sideband interconnect 160.

In accordance with example implementations, the arbitration retiming circuit 280 includes retiming circuits 412 (specifically retiming circuits 412-1, 412-2, 412-3 and 412-4), where each retiming circuit 412 retimes an arbitration output signal that is provided at an arbitration signal output 408 of a particular NIC 134 to provide a retimed, arbitration input signal to an arbitration signal input 404 of another NIC 134. The NICs 134 may serially communicate an ownership token using the arbitration input and output signals. For example, in accordance with example implementations, a NIC 134 may assert (e.g., drive high, or drive to a logic one state) its output arbitration signal to represent that the NIC is relinquishing possession of the ownership token, and an input arbitration signal may be asserted to represent that the receiving NIC 134 acquires possession of the ownership token. In accordance with some implementations, a NIC 134 may retain ownership of the ownership token for a predetermined number of clock signals, and the NIC 134 thereafter passes the ownership token to the next NIC 134 in the serial arbitration communication chain. When a NIC 134 has possession of the ownership token, the NIC 134 may assert its CRS_DV PORT signal (see FIG. 3) and transmit data to the RX channel of its corresponding sideband interconnect 160.

As depicted in FIG. 4, in accordance with example implementations, the retiming circuit 412-1 receives an arbitration output signal (labeled "ARB_OUT4" in FIG. 4) from the NIC 134-4. The NIC 134-4 asserts the ARB_OUT4 signal to represent that the NIC 134-4 is relinquishing possession of the ownership token, i.e., the NIC 134-4 is passing the ownership token to the next NIC 134 in the serial arbitration communication chain (here, NIC 134-1). The retiming circuit 412-1 retimes the ARB_OUT4 signal with edges of the FB_CLK_P1,2 feedback clock signal to provide an arbitration input signal labeled "ARB_IN1" to the NIC 134-1. Therefore, responsive to the NIC 134-4 asserting the ARB_OUT4 arbitration output signal to relinquish possession of the ownership token, the NIC 134-1 acquires possession of the ownership token due to the assertion of the ARB_IN1 signal.

In accordance with example implementations, the retiming circuit 412 may have a clock input 413 and receives the corresponding feedback clock signal; and the retiming circuit 412 may include a chain of two D-type flip-flops. For example, in accordance with example implementations, a non-inverting input of a first D-type flip-flop receives the arbitration output signal. A non-inverting output of the first D-type flip-flop is coupled to the non-inverting input of a second D-type flip-flop. A non-inverting output of the second D-type flip-flop provides the retimed arbitration output signal. The first and second D-type flip-flops may each be clocked by the FB_CLK_P1,2 feedback clock signal.

In a similar manner, the retiming circuits 412-2, 412-3 and 412-4, in accordance with example implementations, retime arbitration output signals providing by corresponding NICs 134 to provide arbitration input signals to other NICs 134 in the serial arbitration communication chain.

As also depicted in FIG. 4, in accordance with example implementations, because a given NIC 134 may not be installed in a corresponding slot connector, the retiming architecture 400 may include a bypass circuit 420 for each slot connector. More specifically, in accordance with example implementations, the bypass circuit 410 receives a corresponding presence, or installation, signal (i.e., an INSTALL1, INSTALL2, INSTALL 3 or INSTALL4 signal) for the associated NIC slot connector. In accordance with example implementations, the bypass circuit 420 responds to the installation signal being de-asserted (e.g., being driven low, or to a logic zero state) to couple the arbitration input 404 and output 408 terminals of the associated NIC 134 together to bypass the NIC 134 in the serial arbitration communication chain.

Figure 5:
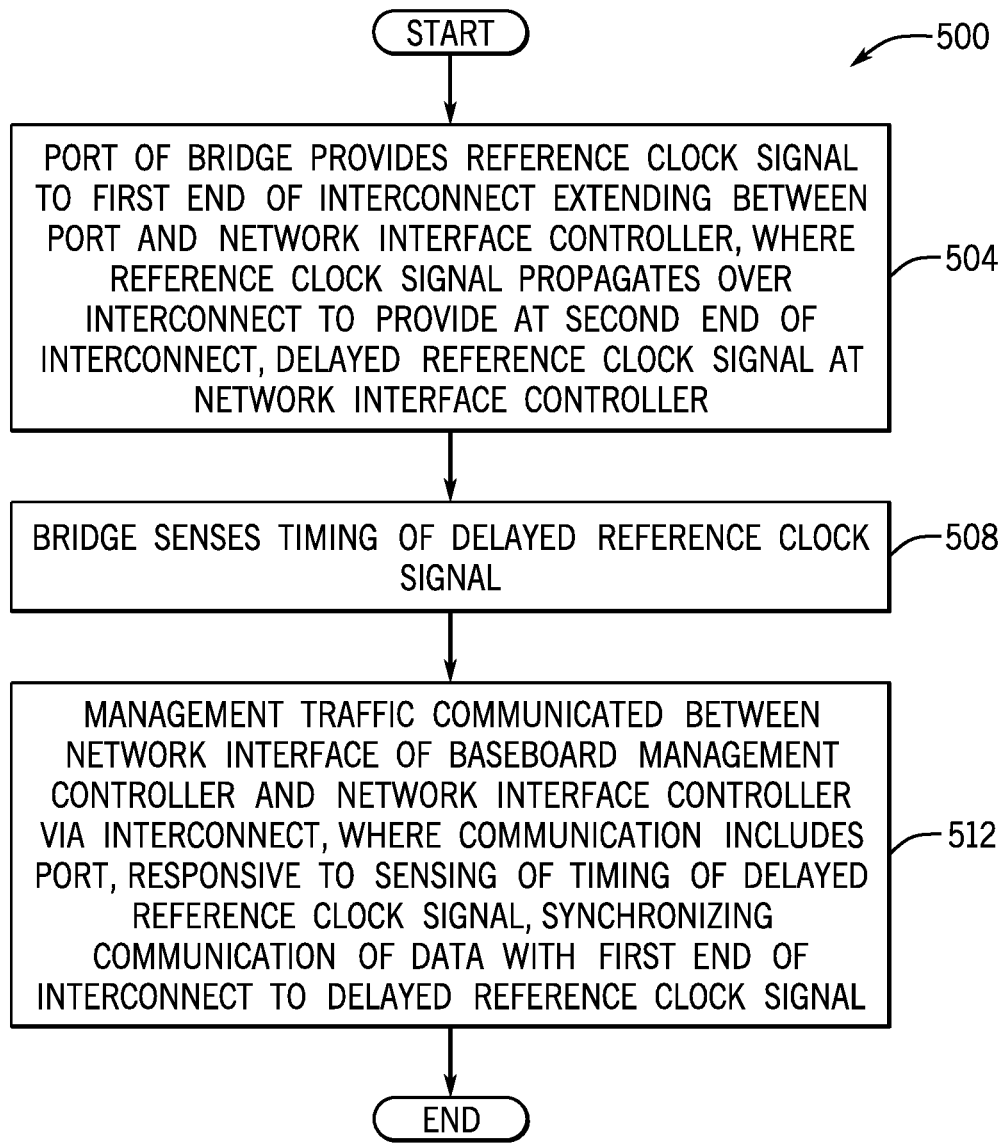
FIG. 5 is a flow diagram depicting a process to communicate management traffic between a BMC and a network interface controller according to an example implementation.

Referring to FIG. 5, in accordance with example implementations, a process 500 includes a port of a bridge providing (block 504) a reference clock signal to a first end of an interconnect extending between the first port and a network interface controller. The reference clock signal propagates over the interconnect to provide, at a second end of the interconnect, a delayed reference clock signal at the network interface controller. Pursuant to the process 500, the bridge senses (block 508) a timing of the delayed reference clock signal. The process 500 includes communicating (block 512) management traffic between a network interface of a baseboard management controller and the network interface controller via the interconnect. The communication of the management traffic includes the port, responsive to the sensing of the timing of the delayed reference clock signal, synchronizing communication of data with the first end of the interconnect to the delayed reference clock signal.

Figure 6:
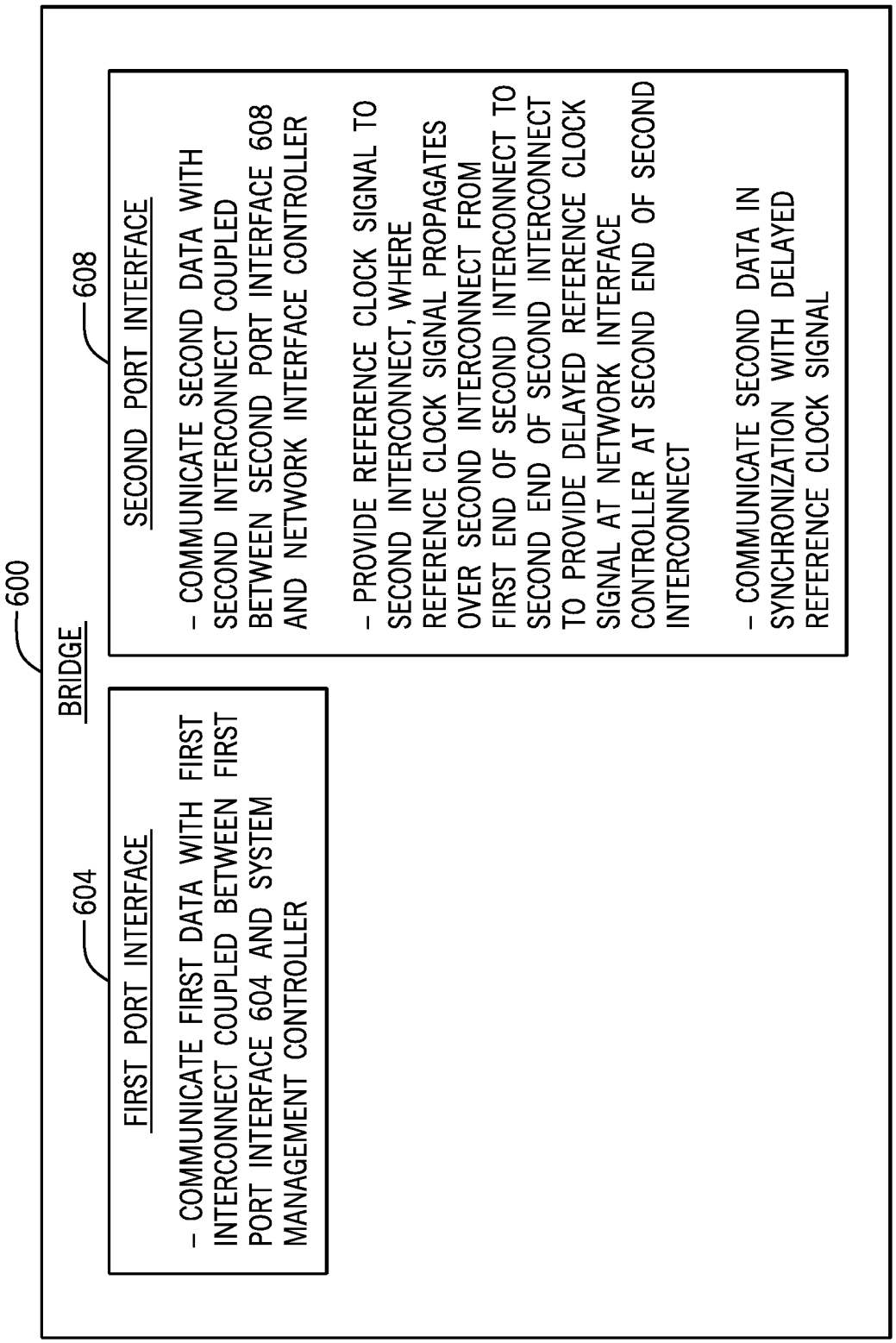
FIG. 6 is a schematic diagram of a bridge to communicate with a system management controller and a network interface controller according to an example implementation.

Referring to FIG. 6, in accordance with example implementations, a bridge 600 includes a first port interface 604 and a second port interface 608. The first port interface 604 communicates first data with a first interconnect that is coupled between the first port interface 604 and a system management controller. The second port interface 608 communicates second data with a second interconnect that is coupled between the second port interface 608 and a network interface controller. The second port interface 608 provides a reference clock signal to the second interconnect. The reference clock signal propagates over the second interconnect from a first end of the second interconnect to a second end of the second interconnect to provide a delayed reference clock signal at the network interface controller at the second end of the second interconnect. The second port interface 608 communicates the second data in synchronization with the delayed reference clock signal.

Figure 7:
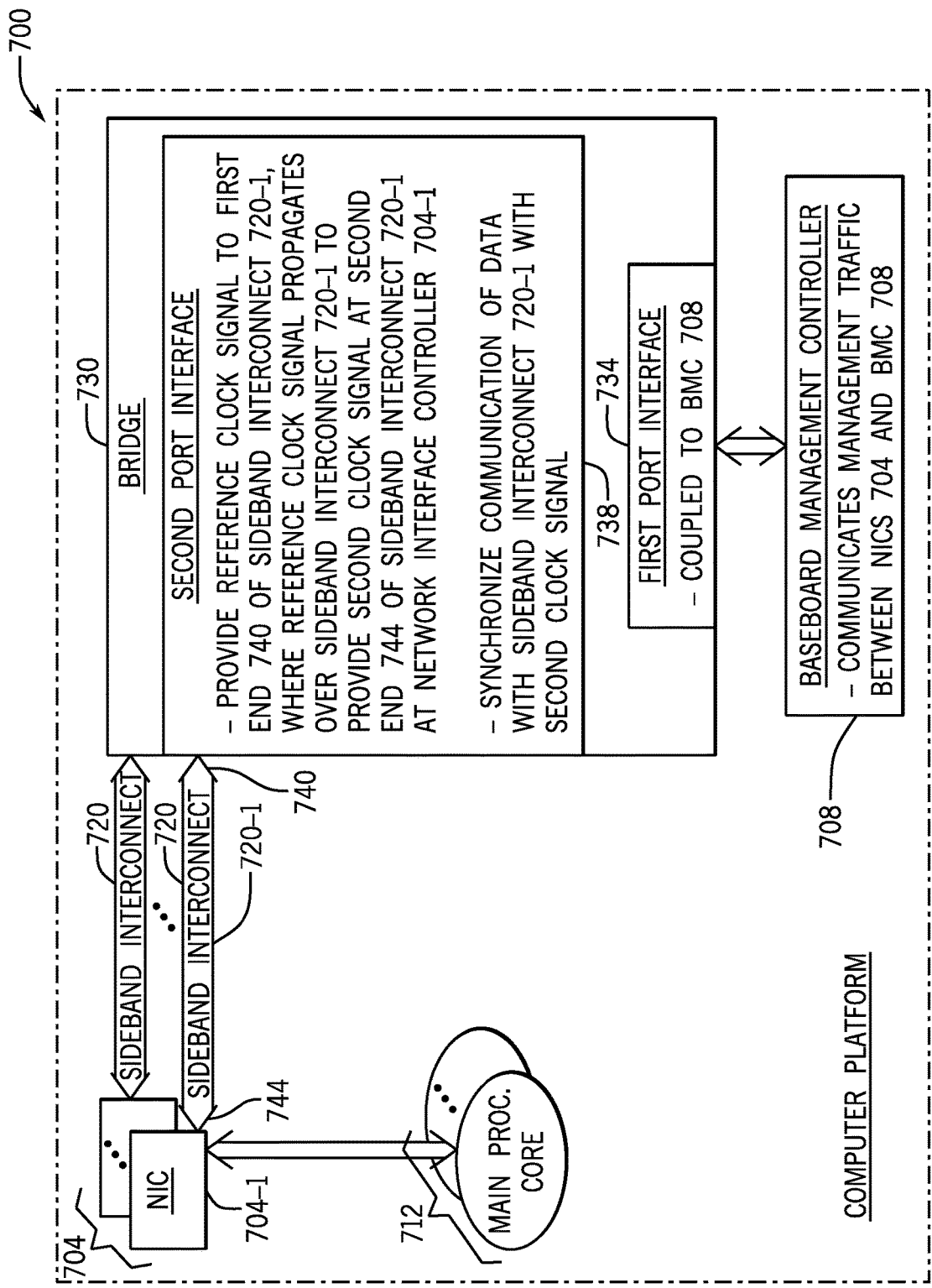
FIG. 7 is a schematic diagram of a computer platform that includes network interface controllers, a BMC and a bridge to communicate management traffic between the network interface controllers and the BMC according to an example implementation.

Referring to FIG. 7, in accordance with example implementations, a computer platform 700 includes network interface controllers 704, a baseboard management controller 708, main processing cores 712, sideband interconnects 720 and a bridge 730. The network interface controllers 704 provide a plurality of input/output (I/O) services, and the main processing cores 712 use the plurality of I/O services. The sideband interconnect 720 are coupled to the network interface controller 704. The bridge 730 is coupled to the sideband interconnects 720 to communicate management traffic between the network interface controller 704 and the baseboard management controller 708. The bridge 730 includes a first port interface 734 and a second port interface 738. The first port interface 734 is coupled to the baseboard management controller 708. The second port interface 738 is coupled to a first network interface controller 704-1 via a first sideband interconnect 720-1. The second port interface 738 provides a reference clock signal to a first end of the first sideband interconnect 720-1. The reference signal propagates over the first sideband interconnect 720-1 to provide a second clock signal at a second end of the first sideband interconnect 720-1 at the first network interface controller 704-1. The second port interface 738 synchronizes communication of data with the first sideband interconnect 720-1 with the second clock signal.

In accordance with example implementations, the bridge includes a second port that provides the reference clock signal to a first end of a second interconnect that extends between the second port and the network interface of the baseboard management controller. The reference clock propagates over the second interconnect to, at a second end of the second interconnect, provide a second delayed reference clock signal to the network interface of the baseboard management controller. The bridge senses a timing of the second delayed reference clock signal. Communicating the management traffic further includes communicating the management traffic via the second interconnect; and the second port, responsive to the sensing of the timing of the second blade reference clock signal, synchronizes the communication of data with the first end of the second interconnect to the second delayed reference clock signal. A particular advantage is that baseboard management controller interconnects having different timing characteristics may be accommodated.

In accordance with example implementations, the first port provides the reference clock signal to a first end of a feedback clock path. The reference clock signal propagates over the feedback clock path to provide a feedback clock signal at a second end of the feedback clock path. The feedback clock path has a length between the first end and the second end corresponding to a length of the interconnect over which the reference clock signal propagates. The bridge sensing the timing of the delayed reference clock signal includes the bridge receiving the feedback clock signal. Synchronizing the communication of data with the first end of the interconnect to the delayed reference clock signal includes at least one of the first port receiving data from the first interconnect in synchronization with the feedback clock signal or transmitting data to the first interconnect in synchronization with the feedback clock signal. A particular advantage is that interconnects having different timing characteristics are accommodated.

In accordance with example implementations, a second port of the bridge provides the reference clock signal to a first end of a second interconnect extending between the second port and a second network interface controller. Management traffic is communicated between the network interface of the baseboard management controller and the second network interface controller via the second interconnect, and this communication includes the second port synchronizing communication of data with the first end of the second interconnect to the first delayed reference clock signal. A particular advantage is that interconnects having different timing characteristics are accommodated.

In accordance with example implementations, a second port of the bridge provides the reference clock signal to a first end of a second interconnect that extends between the second port and a second network interface controller. The reference clock signal propagates over the second interconnect to provide, at a second entity of the second interconnect, a second delayed reference clock signal at the second network interface controller. The bridge senses a timing of the second delayed reference clock signal. Management traffic is communicated between the network interface of the baseboard management controller and the second network interface controller via the second interconnect, and this communication includes the second port, responsive to the sensing of the second delayed reference clock signal, synchronizing communication of data with the first end of the second interconnect to the second delayed reference clock signal. A particular advantage is that interconnects having different timing characteristics are accommodated.

In accordance with example implementations, the first interconnect includes a cable-based interconnect, and the second interconnect includes a cableless interconnect. A particular advantage is that interconnects having different timing characteristics are accommodated.

In accordance with example implementations, the bridge receives an arbitration output signal that is provided by the second network interface controller. The arbitration output signal represents the second network interface controller is relinquishing ownership of a token. The bridge synchronizes the arbitration output signal to the first delayed reference clock signal to provide a retimed arbitration signal representing whether the ownership of the token is being transferred to the first network interface controller. The bridge provides the retimed arbitration signal to a first network interface controller. A particular advantage is that interconnects having different timing characteristics are accommodated.

In accordance with example implementations, the bridge includes a third port that is coupled to the network interface of the baseboard management controller. The method includes, responsive to the first network controller asserting an ownership signal representing the first network controller has ownership of a token, the bridge coupling the first port to the third port to allow the first network interface controller to transmit data to the network interface of the baseboard management controller via the first interconnect. Responsive to the second network controller asserting an ownership signal representing the second network controller having ownership of the token, the bridge couples the second port to the third port to allow the second network interface controller to transmit data to the network interface of the baseboard management controller via the second interconnect. A particular advantage is that interconnects having different timing characteristics are accommodated.

In accordance with example implementations, the bridge includes a third port that is coupled to the network interface of the baseboard management controller. The third port receives transmit data transmitted by the baseboard management controller. The first port transmits the transmitted data to the first interconnect in synchronization with the first delayed reference clock signal. The second port transmits the transmit data to the second interconnect in synchronization with the second delayed reference clock signal. A particular advantage is that interconnects having different timing characteristics are accommodated.

In accordance with example implementations, the bridge includes a third port that is coupled to the network interface of the baseboard management controller via a third interconnect, and the third interconnect is associated with a given clock signal. Responsive to the first interconnect controller asserting ownership by the first network interface controller of an exclusive right to transfer data to the baseboard management controller via the third interconnect, the first port receives, from the first end of the first interconnect, first receive data transmitted by the first network interface controller in synchronization with the first delayed clock signal and the third port transmits the first data to the third interconnect in synchronization with the given clock signal. A particular advantage is that interconnects having different timing characteristics are accommodated.

In accordance with example implementations, responsive to the second network interface controller asserting by the second network interface controller of the exclusive right to transfer data to the baseboard management controller via the third interconnect, the second port receiving, from the first end of the second interconnect, second receive data transmitted by the second network interface controller in synchronization with the second delayed clock signal; and the third port transmitting the second received data to the third interconnect in synchronization with the given clock signal. A particular advantage is that interconnects having different timing characteristics are accommodated.

In accordance with example implementations, the third port provides the reference clock signal to a first end of the third interconnect. The reference clock signal propagates over the third interconnect to, at a second end of the second interconnect, provide a third delayed reference clock signal to the network interface of the baseboard management controller. The bridge uses a feedback clock path to provide the given clock signal, where using the feedback clock path includes providing the reference clock signal to one end of the feedback clock path to provide the given clock signal at a second end of the feedback clock path. The feedback clock path has a length that corresponds to a length of the third interconnect over which the reference clock signal propagates. A particular advantage is that interconnects having different timing characteristics are accommodated.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   providing, by a first port of a bridge, a reference clock signal to a first end of a first interconnect extending between the first port and a first network interface controller, wherein the reference clock signal propagates over the first interconnect to provide, at a second end of the first interconnect, a first delayed reference clock signal at the first network interface controller;
   sensing a timing of the first delayed reference clock signal by the bridge;
   communicating management traffic between a network interface of a baseboard management controller and the first network interface controller via the first interconnect, wherein the communicating of the management traffic comprises the first port, responsive to the sensing of the timing of the first delayed reference clock signal, synchronizing communication of data with the first end of the first interconnect to the first delayed reference clock signal;
   providing, by a second port of the bridge, the reference clock signal to a first end of a second interconnect extending between the second port and a second network interface controller; and
   communicating management traffic between the network interface of the baseboard management controller and the second network interface controller via the second interconnect, comprising synchronizing, by the second port, communication of data with the first end of the second interconnect to the first delayed reference clock signal.

2. A method comprising:

providing, by a first port of a bridge, a reference clock signal to a first end of a first interconnect extending between the first port and a first network interface controller, wherein the reference clock signal propagates over the first interconnect to provide, at a second end of the first interconnect, a first delayed reference clock signal at the first network interface controller;

sensing a timing of the first delayed reference clock signal by the bridge;

communicating management traffic between a network interface of a baseboard management controller and the first network interface controller via the first interconnect, wherein the communicating of the management traffic comprises the first port, responsive to the sensing of the timing of the first delayed reference clock signal, synchronizing communication of data with the first end of the first interconnect to the first delayed reference clock signal;

providing, by a second port of the bridge, the reference clock signal to a first end of a second interconnect extending between the second port and the network interface of the baseboard management controller, wherein the reference clock signal propagates over the second interconnect to, at a second end of the second interconnect, provide a second delayed reference clock signal to the network interface of the baseboard management controller; and sensing, by the bridge, a timing of the second delayed reference clock signal;

wherein communicating the management traffic further comprises:
communicating the management traffic via the second interconnect; and
responsive to the sensing of the timing of the second delayed reference clock signal, synchronizing, by the second port, communication of data with the first end of the second interconnect to the second delayed reference clock signal.

3. A method comprising:

providing, by a first port of a bridge, a reference clock signal to a first end of a first interconnect extending between the first port and a first network interface controller, wherein the reference clock signal propagates over the first interconnect to provide, at a second end of the first interconnect, a first delayed reference clock signal at the first network interface controller;

sensing a timing of the first delayed reference clock signal by the bridge;

communicating management traffic between a network interface of a baseboard management controller and the first network interface controller via the first interconnect, wherein the communicating of the management traffic comprises the first port, responsive to the sensing of the timing of the first delayed reference clock signal, synchronizing communication of data with the first end of the first interconnect to the first delayed reference clock signal;

providing, by a second port of the bridge, the reference clock signal to a first end of a second interconnect extending between the second port and a second network interface controller, wherein the reference clock signal propagates over the second interconnect to provide, at a second end of the second interconnect, a second delayed reference clock signal at the second network interface controller;

sensing, by the bridge, a timing of the second delayed reference clock signal; and communicating management traffic between the network interface of the baseboard management controller and the second network interface controller via the second interconnect, comprising, responsive to the sensing of the second delayed reference clock signal, the second port synchronizing communication of data with the first end of the second interconnect to the second delayed reference clock signal.

4. The method of claim 3, wherein the first interconnect comprises a cable-based interconnect, and the second interconnect comprises a cableless interconnect.

5. The method of claim 3, further comprising:

receiving, by the bridge, an arbitration output signal provided by the second network interface controller, wherein the arbitration output signal represents the second network interface controller is relinquishing ownership of a token;

synchronizing, by the bridge, the arbitration output signal to the first delayed reference clock signal to provide a retimed arbitration signal representing whether the ownership of the token is being transferred to the first network interface controller; and providing, by the bridge, the retimed arbitration signal to first network interface controller.

6. The method of claim 3, wherein the bridge comprises a third port coupled to the network interface of the baseboard management controller, the method further comprising:

responsive to the first network controller asserting an ownership signal representing the first network controller having ownership of a token, coupling, by the bridge, the first port to the third port to allow the first network interface controller to transmit data to the network interface of the baseboard management controller via the first interconnect; and responsive to the second network controller asserting an ownership signal representing the second network controller having ownership of the token, coupling, by the bridge, the second port to the third port to allow the second network interface controller to transmit data to the network interface of the baseboard management controller via the second interconnect.

7. The method of claim 3, wherein the bridge comprises a third port coupled to the network interface of the baseboard management controller, the method further comprising:

receiving, by the third port, transmit data transmitted by the baseboard management controller;

transmitting, by the first port, the transmit data to the first interconnect in synchronization with the first delayed reference clock signal; and transmitting, by the second port, the transmit data to the second interconnect in synchronization with the second delayed reference clock signal.

8. The method of claim 3, wherein the bridge comprises a third port coupled to the network interface of the baseboard management controller via a third interconnect, and the third interconnect being associated with a given clock signal, the method further comprising:

responsive to the first network interface controller asserting ownership by the first network interface controller of an exclusive right to transfer data to the baseboard management controller via the third interconnect:

receiving, by the first port from the first end of the first interconnect, first receive data transmitted by the first network interface controller in synchronization with the first delayed clock signal; and transmitting, by the third port, the first receive data to the third interconnect in synchronization with the given clock signal.

9. The method of claim 8, further comprising:

responsive to the second network interface controller asserting ownership by the second network interface controller of the exclusive right to transfer data to the baseboard management controller via the third interconnect:

receiving, by the second port from the first end of the second interconnect, second receive data transmitted by the second network interface controller in synchronization with the second delayed clock signal; and transmitting, by the third port, the second receive data to the third interconnect in synchronization with the given clock signal.

10. The method of claim 8, further comprising:

providing, by the third port, the reference clock signal to a first end of the third interconnect, wherein the reference clock signal propagates over the third interconnect to, at a second end of the second interconnect, provide a third delayed reference clock signal to the network interface of the baseboard management controller; and using a feedback clock path, by the bridge, to provide the given clock signal, comprising providing the reference clock signal to one end of the feedback clock path to provide the given clock signal at a second end of the feedback clock path, wherein the feedback clock path has a length corresponding to a length of the third interconnect over which the reference clock signal propagates.

11. A bridge comprising:

a first port interface to communicate first data with a first interconnect coupled between the first port interface and a system management controller;

a first-in-first-out (FIFO) buffer comprising a first FIFO port and a second FIFO port;

a second port interface to:

communicate second data with a second interconnect coupled between the second port interface and a first network interface controller;

provide a reference clock signal to the second interconnect, wherein the reference clock signal propagates over the second interconnect from a first end of the second interconnect to a second end of the second interconnect to provide a first delayed reference clock signal at the first network interface controller at the second end of the second interconnect; and communicate the second data in synchronization with the first delayed reference clock signal, wherein:

the first port interface communicates the first data with the first interface in synchronization with a given clock signal;

the first FIFO port is clocked by the given clock signal; and the second FIFO port is clocked by the first delayed reference clock signal.

12. The bridge of claim 11, further comprising:

a third port interface to communicate third data with a third interconnect coupled between the second port and a second network interface controller, wherein the third port interface to:

provide a reference clock signal to the third interconnect, wherein the reference clock signal propagates over the third interconnect from a first end of the third interconnect to a second end of the third interconnect to provide a second delayed reference clock signal at the second network interface controller at the second end of the third interconnect; and communicate the third data in synchronization with the second delayed reference clock signal.

13. The bridge of claim 11, wherein the first port interface communicates the first data in accordance with a Network Controller-Sideband Interface (NC-SI) standard, and the second port interface communicates the second data in accordance with the NC-SI standard.

14. A computer platform comprising:

a plurality of network interface controllers to provide a plurality of input/output (I/O) services;

a baseboard management controller;

a plurality of main processing cores to use the plurality of I/O services;

a plurality of sideband interconnects coupled to the plurality of network interface controllers; and a bridge coupled to the plurality of sideband interconnects to communicate management traffic between the plurality of network interface controllers and the baseboard management controller, wherein the bridge comprises:

a first port interface coupled to the baseboard management controller;

a second port interface coupled to a first network interface controller of the plurality of network interface controller via a first sideband interconnect of the plurality of sideband interconnects, wherein the second port interface to:

provide a reference clock signal to a first end the first sideband interconnect, wherein the reference clock signal propagates over the first sideband interconnect to provide a second clock signal at a second end of the first sideband interconnect at the first network interface controller; and synchronize communication of data with the first sideband interconnect with the second clock signal.

15. The computer platform of claim 14, wherein the bridge further comprises:

a third port interface to communicate data with a second network interface controller of the plurality of network interface controllers via a third sideband interconnect of the plurality of sideband interconnects in synchronization with a third clock signal that is asynchronous to the second clock signal.

16. The computer platform of claim 15, wherein the first sideband interconnect comprises a cable-based interconnect, and the second sideband interconnect comprises a cableless interconnect.

* * * * *